United States Patent [19]

Nozaki

[11] Patent Number: 5,214,879
[45] Date of Patent: Jun. 1, 1993

[54] WEATHER STRIP

[75] Inventor: Masahiro Nozaki, Ama, Japan

[73] Assignee: Toyoda Gosei Co., Ltd., Nishikasugai, Japan

[21] Appl. No.: 962,020

[22] Filed: Oct. 15, 1992

Related U.S. Application Data

[63] Continuation of Ser. No. 716,726, Jun. 17, 1991, abandoned.

[30] Foreign Application Priority Data

Jun. 15, 1990 [JP] Japan .......................... 2-157314

[51] Int. Cl.⁵ .................................................. E06B 7/16
[52] U.S. Cl. ................................... 49/475.1; 49/493.1
[58] Field of Search .............. 49/475, 479, 493, 494, 49/498, 492

[56] References Cited

U.S. PATENT DOCUMENTS

| | | | |
|---|---|---|---|
| 1,862,285 | 6/1932 | Terry et al. ........................... | 49/475 |
| 2,657,438 | 11/1953 | Spraragen ............................ | 49/492 |
| 3,020,606 | 2/1962 | Ziffer .................................... | 49/492 |
| 4,306,379 | 12/1982 | Linstromberg ................... | 49/493 X |
| 4,344,365 | 8/1982 | Fritz et al. ........................ | 49/475 X |
| 4,409,756 | 10/1983 | Audenino et al. ................ | 49/493 X |
| 4,601,245 | 7/1986 | Kleykamp ......................... | 49/475 X |
| 4,667,442 | 5/1987 | Hiramatsu et al. ............... | 49/494 X |
| 4,827,670 | 5/1989 | Kogiso et al. . | |
| 4,837,980 | 7/1990 | Akachi et al. . | |

FOREIGN PATENT DOCUMENTS 226419  9/1989  Japan ..................... 49/475

Primary Examiner—Peter M. Cuomo
Assistant Examiner—Jerry Redman
Attorney, Agent, or Firm—Cushman, Darby & Cushman

[57] ABSTRACT

A vehicle weather strip having a molded end portion with a metal insert which includes a right angled protrusion that fits into a hollow projection to strengthen and stiffen it for allowing ready insertion of the projection into a hole in a body panel of a vehicle.

5 Claims, 3 Drawing Sheets

WEATHER STRIP

This ia a continuation of application Ser. No. 07/716,726, filed on Jun. 17, 1991, now abandoned.

FIELD OF THE INVENTION

This invention relates to a weather strip to be used in a motor vehicle, and more particularly to a weather strip to be attached along a door opening or a periphery of a door panel of the motor vehicle.

BACKGROUND OF THE INVENTION

Weather strips of the general type of this invention may be seen in U.S. Pat. No. 4,937,980.

A conventional weather strip is composed of a strip-shaped tubular extruded main portion, and molded end portions which are shaped like surfaces of a body panel or a door panel to which they connect. The molded end portions connect the extruded portion. The molded end portion is firmly fixed to a body panel by screws.

In the motor vehicle shown in FIG. 8, a tubular weather strip which seals a periphery of a door glass is attached along a roof side section 1. In FIG. 9, a molded end portion 5 in which is embedded a metal insert 6 is formed on an end of an extruded portion 4 for placement at the part of circle A in FIG. 8. As shown in FIGS. 9 and 10, the molded end portion 5 is firmly fixed to a body panel 2 through the apertures 7 which extends through the insert 6 by screws 7'. The molded end portion 5 is held by two or more screws 7', causing a large number of manufacturing steps to be needed. The screw portions avoid seal line S which is formed in the molded end portion 5 and the periphery of a door glass.

In case of the molded end portion 5 being held by only one screw 7', an end of the molded end portion 5 readily moves away from the surface of the body panel since it is not sufficiently fixed thereto. Furthermore, the molded end portion 5 distorts pivotally about a screw while the molded end portion 5 is being fixed to the body panel.

SUMMARY OF THE INVENTION

An object of the present invention is to provide a weather strip which significantly reduces the number of manufacturing steps.

According to the present invention, there is provided in a molded end portion of a weather strip a metal insert which has a protrusion fitting in a fastening part projecting from the molded end portion for fastening through an aligned hole in a body panel of a motor vehicle.

Other objects of the invention and the full structure itself will become apparent from the following detailed description of the invention in conjunction with the appending drawings.

BRIEF DESCRIPTION OF THE DRAWINGS

FIG. 1 is a perspective view of a molded end portion of a roof side weather strip;

FIG. 2 is a partial perspective view of an insert;

FIG. 3 is a cross-sectional view showing the attached state of the roof side weather strip, which is taken along the line III—III in FIG. 1;

FIG. 4 is a side view of a rear door on which a door weather strip of the present invention is mounted;

FIG. 5 is an enlarged perspective view of the portion of the weather strip shown in circle B in FIG. 4;

FIG. 6 is a cross-sectional view taken along the line VI—VI in FIG. 5;

FIG. 7 is a cross-sectional view taken along the line VII—VII in FIG. 5;

DESCRIPTION OF THE PREFERRED EMBODIMENT

Figure 1:
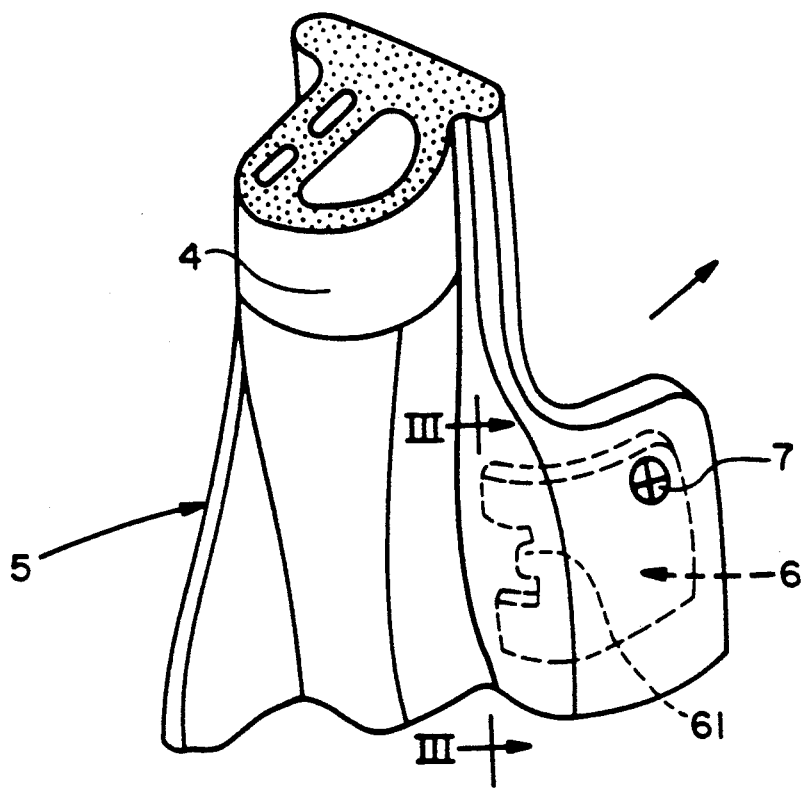
FIGS. 1 through 3 illustrates a first embodiment of a weather strip according to the present invention.
Figure 2:
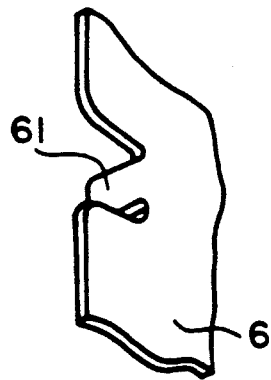
Figure 3:
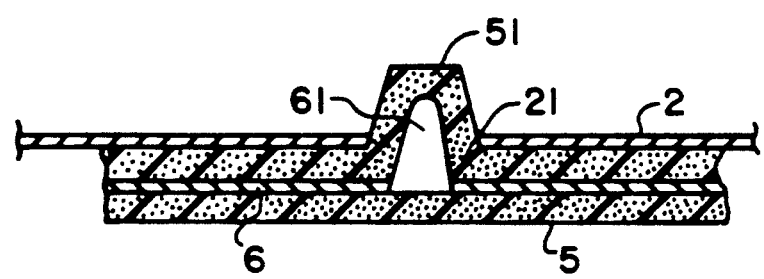

FIGS. 1 through 3 illustrate a first embodiment of the present invention.

A weather strip is composed of a strip-shaped tubular extruded main portion 4 made of sponge rubber and having connected at each end a molded end portion 5 which has a shape corresponding to the surface of a body panel 2. The molded end portion 5 has embedded in it a metal insert 6. A protrusion 61 extends at a right angle from a base portion of the insert 6, and protrudes into a hollow projecting part 51 as shown in FIG. 3. Projecting part 51 is thereby strengthened which allows for its ready insertion into an aligned hole 21 of body panel 2. Insert 6 is formed with a hole which is aligned with hole 7 in the molded end portion 5 and both holes are aligned with a hole of the body panel 2.

The above-described weather strip is manufactured as follows. First, the strip-shaped tubular main portion 4 is manufactured by extrusion. Then, an end of the strip-shaped tubular extruded main portion 4 and the insert 6 are set in a cavity of a metal mold, and the molded end portion 5 is formed by molding (injection molding, transfer molding or the like). The molded end portion 5 made of solid rubber contains the insert 6, and integrally connects to the end of the strip-shaped tubular extruded main portion 4 made of sponge rubber.

Figure 8:
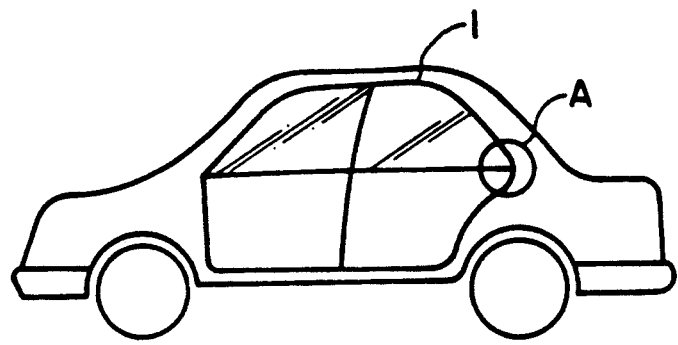
FIG. 8 is a side view of a motor vehicle.
Figure 9:
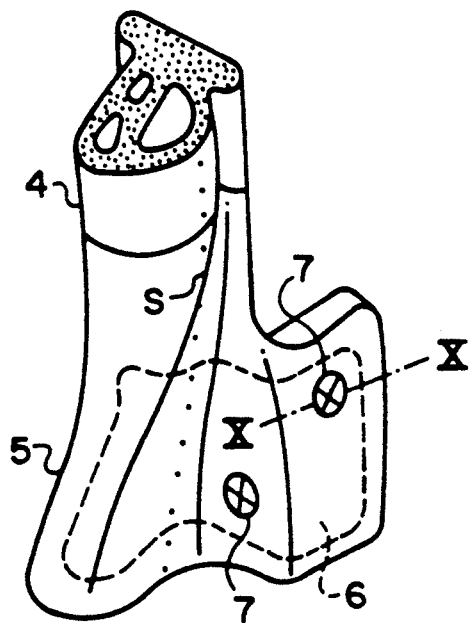
FIG. 9 is a perspective new of a molded end portion of a roof side weather in the prior art.
Figure 10:
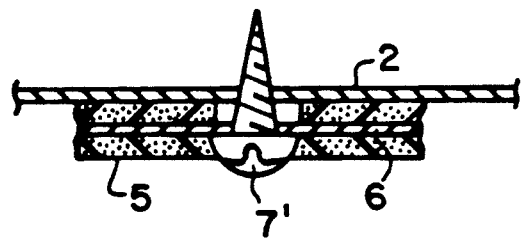
FIG. 10 is a cross-sectional view showing the attached state of the roof side weather strip, which is taken along the line X—X in FIG. 9.

The above-described weather strip is attached to the body panel 2 of a motor vehicle as follows. First, the strip-shaped tubular extruded main portion 4 is inserted into a retainer formed along a roof side 1 with reference to FIG. 8. Thereafter, as shown in FIG. 3, the projecting part 51 of the molded end portion 5 is inserted into the hole 21 of the body panel 2 which is aligned with the projecting part 51. As shown in FIG. 10, the molded end portion 5 is then fixed to the body panel 2 through aperture 7 which extends through the insert 6 by a screw 7'.

The diameter of hole 21 in body panel 2 is formed slightly smaller than the outside diameter of the projecting part 51. The projecting part 51 made of solid rubber is elastic and squeezes in when the projecting part 51 is inserted into the hole 21, so that the projecting part 51 is easily inserted into the hole 21 because it is stiffened by the protrusion 61. Thereafter, the projecting part 51 restores to the original state by rubber elasticity, so that the projecting part 51 securely touches the periphery of hole 21.

FIGS. 4 through 7 illustrate a second embodiment of the present invention.

Figure 4:
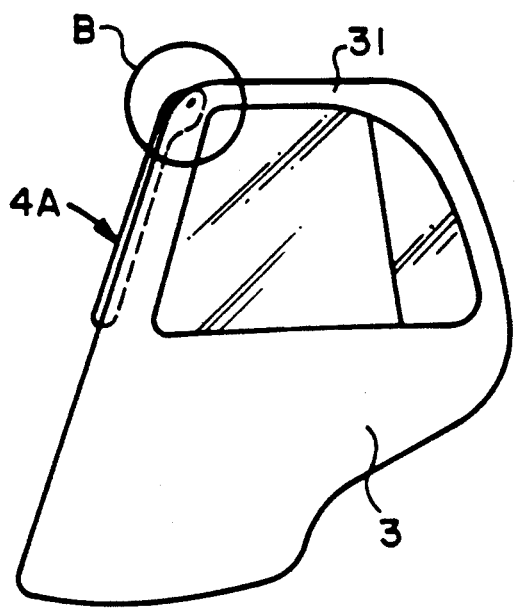
FIGS. 4 through 7 illustrate a second embodiment of a weather strip according to the present invention.
Figure 5:
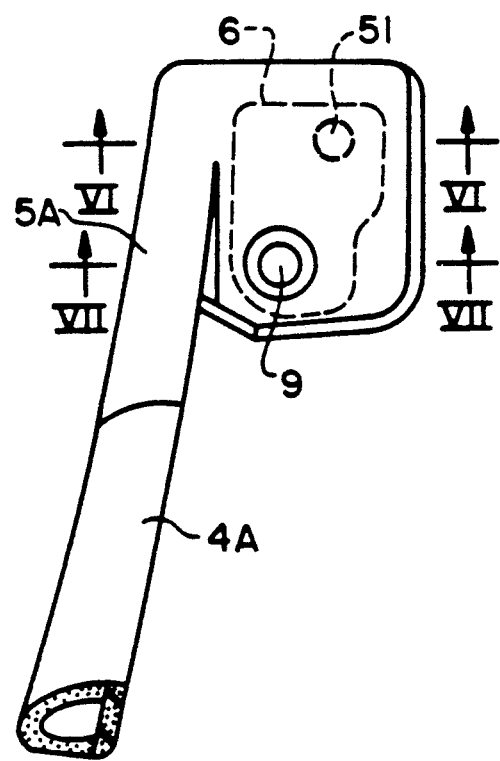
Figure 6:
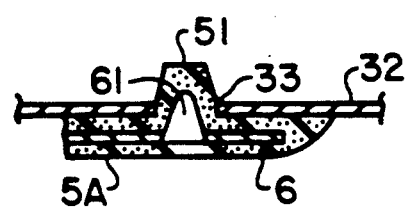
Figure 7:
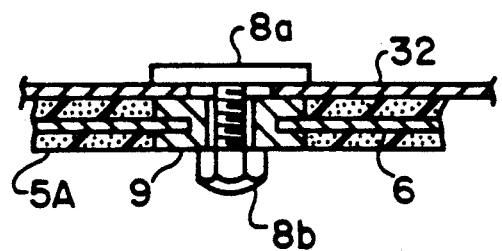

As shown in FIG. 4 a tubular weather strip is attached along a front periphery of a door sash 31 of a rear door 3. The tubular weather strip seals between the front periphery of the door sash 31 and rear periphery of a door sash of a front door, and covers a center pillar. As shown in FIG. 5, a molded end portion 5A in which is embedded a metal insert 6 is connected to an upper end of the strip-shaped tubular extruded main portion 4A. As shown in FIG. 6, a protrusion 61 extends downward from a base portion of the insert 6. The molded end portion 5A is formed a projecting part 51 so as to contain the protrusion 61. The projecting part 51 of the molded end portion 5A is inserted into the hole 33 of a door panel 32 of the door sash 31. Thereafter, as shown in FIG. 7, the molded end portion 5A is fixed to the door panel 32 through a washer 9 by a bolt 8a and nut 8b.

What is claimed is:

1. A weather strip for a motor vehicle, comprising:
   a strip-shaped tubular main portion for attaching along a door opening;
   a molded end portion connected to an end of said strip-shaped tubular main portion, and
   an insert embedded in said molded end portion, said insert having a rigid protrusion, said molded end portion having a projecting part containing said protrusion, said projecting part being inserted into a hole of a body panel, said molded end portion being secured to the body panel by a fastener member.

2. A weather strip according to claim 1, wherein an outside diameter of said projecting part is formed slightly larger than a diameter of said hole.

3. A weather strip according to claim 1, wherein said strip-shaped tubular main portion is made of sponge rubber.

4. A weather strip according to claim 2, wherein said molded end portion is made of one of solid rubber and sponge rubber.

5. A weather strip for a motor vehicle having a door panel, comprising:
   a strip-shaped tubular main portion attached along a periphery of said door panel;
   a molded end portion connected to an end of said strip-shaped tubular main portion; and
   an insert embedded in said molded end portion, said insert having a rigid protrusion,
   said molded end portion having a projecting part containing said protrusion, said projecting part being inserted into an aligned hole of said door panel, said molded end portion being secured to the body panel by a fastener member.

* * * * *